July 4, 1944.                A. E. JUVE                 2,352,637
                          COMPOSITE ARTICLE
                          Filed Oct. 7, 1939
Plasticized Polyvinyl Halide
Vulcanized Polyhaloprene
Halogenated Rubber
Rigid Base
Inventor
Arthur E. Juve
By Willis J. Avery
Atty Patented July 4, 1944

2,352,637

UNITED STATES PATENT OFFICE 2,352,637

COMPOSITE ARTICLE

Arthur E. Juve, Akron, Ohio, assignor to The B. F. Goodrich Company, New York, N. Y., a corporation of New York Application October 7, 1939, Serial No. 298,471

4 Claims. (Cl. 154—2)

This invention relates to composite articles in which a plasticized polyvinyl halide is adhered to a rigid base by halogenated rubber.

Although polyvinyl halides do not in general adhere to other materials, it is known that strong bonds between polyvinyl halides and rigid bases such as metal, wood, stone, etc., are obtained by the use of halogenated rubber cements. To obtain increased flexibility, it is generally desirable to add a plasticizer to the polyvinyl halide. The gamma polymer of vinyl chloride is particularly useful when plasticized, for it forms resilient, rubber-like compositions as disclosed in U. S. Patent No. 1,929,453, issued to Waldo L. Semon. It has been found, however, that in composite articles of the type described, the plasticizer has a tendency to bleed into the halogenated rubber, thereby weakening and eventually destroying the adhesion.

It is the principal object of this invention to provide a permanent adhesive bond between a plasticized polyvinyl halide and a base.

We have discovered that if a layer of polymerized haloprene is interposed between the plasticized polyvinyl halide and the layer of halogenated rubber contiguous to the base, the plasticizer does not bleed into the halogenated rubber layer, and a permanent adhesive bond is obtained.

In order that the invention may be better understood, reference is made to the accompanying drawing in which the sole figure shows a section of an article made by the method of this invention, said article consisting of successive layers of a rigid base such as iron, halogenated rubber such as chlorinated rubber containing approximately 65% of chlorine, a polyhaloprene such as neoprene, and a layer of a plasticized polyvinyl halide such as plasticized gamma polyvinyl chloride. The relative thicknesses of the different layers in the drawing are not intended to represent the actual thicknesses which will be employed in constructing the article, for the drawing is designed to illustrate merely the relative positions of the different materials.

In the practice of this invention, the base is covered with one or more coats of halogenated rubber cement, the highly chlorinated rubber containing in the neighborhood of 65% of chlorine being a preferred material. A layer of a polymerized haloprene, compounded so that it will be vulcanized when the composite product is heated, is next applied in the form of a thin sheet or a cement. Although any of the polymerized chlorobutadienes or bromobutadienes may be employed, the resilient polymer of chloroprene known as neoprene is preferred. The plasticized polyvinyl halide such as the alpha, beta, or gamma polymer of vinyl chloride, polyvinyl bromide, or a polyvinyl halide formed by copolymerizing vinyl chloride with a minor proportion of a vinyl organic ester such as vinyl acetate is then applied to the polymerized haloprene, and the assemblage is heated under pressure until the polymerized haloprene interlayer is vulcanized.

Although satisfactory adhesion is ordinarily obtained by merely placing the layer of plasticized polyvinyl halide on the polymerized haloprene prior to vulcanization, a halogenated rubber cement may be employed between the plasticized polyvinyl halide and the polymerized haloprene when the best attainable adhesion is desired. This process is claimed in my copending application Serial No. 293,267, filed October 6, 1939.

Employing the method of this invention, a permanent bond was formed between plasticized gamma polyvinyl chloride and iron. The following compositions were prepared:

*Vulcanizable polymerized haloprene*

|  | Parts by weight |
|---|---|
| Neoprene | 55.55 |
| Magnesia | 1.65 |
| Litharge | 11.10 |
| Gas black | 22.30 |
| Rosin oil | 5.55 |
| Maleic acid | 1.65 |
| Sulfur | 1.10 |
| Antioxidant | 1.10 |

*Halogenated rubber cement*

|  | Parts by weight |
|---|---|
| Tornesit [1] | 378.5 |
| Tetralin | 37.9 |
| Benzene | 3,330.0 |

*Plasticized polyvinyl halide*

|  | Parts by weight |
|---|---|
| Gamma polyvinyl chloride | 55.80 |
| Tricresyl phosphate | 41.70 |
| Lead silicate (stabilizer) | 2.00 |
| Gas black | .50 |

A piece of sandblasted iron, a sheet of the vulcanizable polymerized haloprene ⅛" thick, and a sheet of the plasticized polyvinyl halide 1/16" thick, were each coated on one side with the halogenated rubber cement.

[1] A commercially-available product believed to be chlorinated rubber containing approximately 65% of chlorine.

The layers were assembled by placing the uncoated side of the neoprene next to the coated side of the iron and the coated sides of the neoprene and the plasticized polyvinyl chloride in contact. The structure was heated under pressure for 15 minutes at 320° F. A composite product having excellent adhesion throughout was obtained.

Although I have herein disclosed a specific embodiment of my invention, I do not intend to limit the invention solely thereto, for it will be obvious to those skilled in the art that many variations and modifications are within the spirit and scope of the invention as defined in the appended claims.

I claim:

1. A composite structure comprising successive layers of a rigid base, halogenated rubber, a vulcanized polymerized haloprene, and a plasticized polyvinyl halide, all of which have been bonded into an integral whole by vulcanizing said polymerized haloprene layer after assembling the composite.

2. A composite structure comprising successive layers of a metallic base, chlorinated rubber, vulcanized neoprene, and plasticized gamma polyvinyl chloride, all of which have been bonded into an integral whole by vulcanizing said neoprene layer after assembling the composite.

3. The method which comprises interposing a layer of a vulcanizable polymerized haloprene composition between a plasticized polyvinyl halide and an adjacent layer of halogenated rubber contiguous to a rigid base, and subjecting the composite article under pressure to heat sufficient to vulcanize the polymerized haloprene.

4. The method which comprises interposing a layer of a vulcanizable neoprene composition between plasticized gamma polyvinyl chloride and an adjacent layer of chlorinated rubber contiguous to a metallic base, and subjecting the composite article under pressure to heat sufficient to vulcanize the neoprene.

ARTHUR E. JUVE.